Dec. 4, 1934.  N. TROYER  1,983,252

CAN VACUUMIZING AND SEALING MACHINE

Filed June 21, 1929  9 Sheets-Sheet 1

Fig. 1

INVENTOR
NELSON TROYER
BY
Cook & Robinson
ATTORNEY

Dec. 4, 1934.   N. TROYER   1,983,252
CAN VACUUMIZING AND SEALING MACHINE
Filed June 21, 1929   9 Sheets-Sheet 7

INVENTOR
NELSON TROYER
BY
Cook & Robinson
ATTORNEY

Patented Dec. 4, 1934

1,983,252

UNITED STATES PATENT OFFICE 1,983,252

CAN VACUUMIZING AND SEALING MACHINE

Nelson Troyer, Seattle, Wash., assignor to Continental Can Company, Inc., New York, N. Y., a corporation of New York Application June 21, 1929, Serial No. 372,772

17 Claims. (Cl. 113—82)

This invention relates to improvements in machines for sealing cans in vacuo, and has particular reference to a vacuumizing machine wherein the cans are delivered into and from the vacuumizing chamber by means of a continuously rotating, pocketed valve, and wherein the cans are sealed by the action of a double seamer mechanism, inclosed within the vacuumizing chamber, and which is of that type embodying first and second operation seaming rolls to which the cans are successively advanced.

It is the principal object of the present invention to provide a can vacuumizing and sealing machine of the above character in which the cans are delivered into and from the vacuumizing chamber through the medium of a continuously rotating valve, which effectively and efficiently seals the passage against the inlet of outside air and which is so arranged with respect to the seamer mechanism that full and sufficient time is given for complete vacuumization of the cans before they reach the seamer rolls.

Another object of the invention is to provide a rotating, valve for the delivery of cans into, and also for their delivery from, the vacuumizing chamber, that is entirely free of internally contained ejector devices for removal of the cans from the valve pockets and which is so supported and is so designed as to be adjustable to maintain an air-tight seal without wear or friction on its sealing surfaces.

It is also an object of the invention to so arrange the mechanism within the vacuumizing chamber that easy accessibility thereto is permitted for repair or replacement of parts and also for clearing the machine in the event of a jam, resulting from any cause.

Another object of the invention resides in the provision of extractor turrets of novel construction whereby the cans are removed from the valve pockets for delivery to the seamer, and later are again removed from the valve and placed on the discharge conveyer.

Other objects of the invention reside in the provision of automatic means for stopping the machine in event of a jam occurring in the valve mechanism; also automatic means for stopping the machine should the degree of vacuum become insufficient.

Another object resides in the adaptability of the machine to the vacuumizing of cans of various sizes.

Other objects of the invention reside in the various details of construction and in the combination of parts, as will hereinafter be described.

In accomplishing these and other objects of the invention, I have provided the improved details of construction, the preferred forms of which are illustrated in the accompanying drawings, wherein—

Referring more in detail to the drawings—

First briefly describing the general arrangement of the various parts of the machine, as they are disclosed best by Figures 2, 4 and 5,—1 designates the vacuumizing chamber within which are contained the seamer heads 2 and 3 of the two stage double seaming mechanism, designated in its entirety by reference character S, whereby the can ends are seamed onto the bodies; the seamer heads 2 comprising the first operation rolls and the seamer heads 3 the second operation rolls. The cans, with upper ends loosely clinched thereon, are delivered into the chamber 1 for vacuumization and seaming through the medium of a pocketed, rotatably driven valve 4 contained within a casing 5 which at one side is in open communication with the vacuumizing chamber. This same valve serves also as the means through which the vacuumized and seamed cans are delivered from the chamber. The cans, or containers, designated by reference numeral 6, are conveyed to and from the machine along a horizontal platform 7, by the action of chain conveyers 8—8; the cans on delivery to the machine being brought into contact with a feed screw 9 which spaces them properly and times their delivery to a two arm, revolubly driven turret 10 whereby they are pushed along a guide 11 and successively delivered into pockets 12 provided in the rotating valve 4. A two arm extractor turret 13 later described in detail, located within the chamber, operates to remove the cans from the valve pockets and to advance them along a guide 14 into the vacuumizing chamber and into equally spaced pockets 15 of a horizontal, intermittently moving turret 16 whereby they are forwarded by intermittent advance movements within a circular guide 16' to the double seamer heads 2 and 3, and finally are delivered from the seamer along a guide 17 again into the valve 4 to be carried thereby from the machine. An extractor turret 18, similar to turret 13, removes the vacuumized and seamed cans from the valve pockets and advances them along a guide 19 onto the conveyer chains 8 whereby they are delivered from the machine. The valve 4, in the present instance, serves not only as a conveyer for the delivery of cans into and from the vacuumizing chamber but serves also to seal the passages through which they pass against the admittance of outside air, and it is in the construction of the valve and parts closely associated therewith, and their combination, that important objects of the invention reside, as will presently be pointed out.

The vacuum chamber 1 is contained within a substantially circular housing 20 provided with suitable openings, as at 22, for permitting access to the enclosed mechanism for the purpose of making adjustments, or repairs thereto, or for other purposes; these openings being fitted with hingedly mounted, air-tight closures 23. Preferably, the closures at opposite sides would contain glass panels, as at 24, through which action of the enclosed mechanism could be observed.

The vacuum chamber housing 20 rests upon and is fixed solidly to a supporting housing 26 within which is enclosed the principal gearing whereby the various parts of the machine are driven. This lower housing is also of air-tight construction and is provided at the back with an opening 27 of considerable area through which access may be had for replacement, repair or adjustment of mechanism. This opening is provided with a hingedly mounted, air-tight door, or closure 28.

The casing 5 for the valve 4, is bolted to the side of the housing 20 and also is bolted to a supporting housing 29 which encloses the valve and turret driving and timing gears, presently described. Likewise, the housing 29 is bolted to the side of the base housing 26 and both of these housings, 26 and 29, are supported on and fixed to a base casting 30. The top of the vacuum chamber is covered by a dome-like housing 21 within which the upper structure of the double seamer mechanism is contained, and connected with this dome is a pipe —V—, see Figures 2 and 14, leading from a source of vacuum. This housing 21 also has suitable openings for inspection and repair of the seamer mechanism, and these are equipped with closures as at 21'.

The conveyer platform 7 is fixed to the forward edge of the top of the housing 29 along the front of the valve casing 5 and the conveyer chains 8—8 operate within parallel slots 31 in the top of the platform. The chains 8 are of continuous belt form and they extend about driving sprocket wheels 32 mounted on shafts 33—33', carried in suitable bearings, as at 34, at opposite ends of the platform. Shaft 33 is equipped at its inner end, see Figures 4 and 10, with a driving bevel gear 35 and this is driven by an intermeshing bevel gear 36 on the upper end of a vertical shaft 37 carried in a supporting bearing 38 fixed to platform 7. A sprocket chain belt 39 extends about sprocket wheels 40 and 41 that are keyed, respectively, on the shaft 37 and on a vertical, driven shaft 42, which is revolubly mounted in suitable bearings 43 and 44 provided therefor in the housing 29 and casing 5, respectively, and which at its upper end has operative connection with the extractor turret 18.

The timing screw 9 is rotatably mounted at its ends in a supporting guard frame 48 and is provided at its outer end with a driving bevel gear 49 in mesh with a bevel gear 50 on the upper end of a vertical, driven shaft 51. Shaft 51 is mounted in a bearing 52 formed in the platform 7 and it is driven by a sprocket chain belt 53 operating about sprocket wheels 54 and 55 keyed, respectively, on the shaft 51 and on a vertical, driven shaft 56 which at its upper end carries the turret 10. The shaft 56, as shown in Figure 10, is revolubly carried in bearings 57 formed in the housing 29.

The feed screw mounting frame 48 is adapted for horizontal, pivotal adjustment about the upper end of shaft 51 and at its inner end has an arcuate slot 58 through which a bolt 59 extends into the platform 7. This bolt may be tightened to retain any adjustment of the support and screw. Fixed to the platform, in spaced relation to the timing screw, is a flanged guide 60 including a yieldable section in the nature of a horizontally swinging arm 62. This arm is pivotally mounted by a pin 63 through its inner end and its opposite end is urged inwardly to hold the cans, delivered by the conveyers 8, against the screw, by the inward pressure thereagainst of a depending arm 65 of a bell crank 66

(see Fig. 4a) that is pivotally mounted on the guide and which has a horizontal arm 67 provided with a weight 68. This outwardly yieldable guide arm prevents jams and automatically spaces and positions the cans properly against the threads of the timing screw for delivery to the feed turret.

Figure 2:
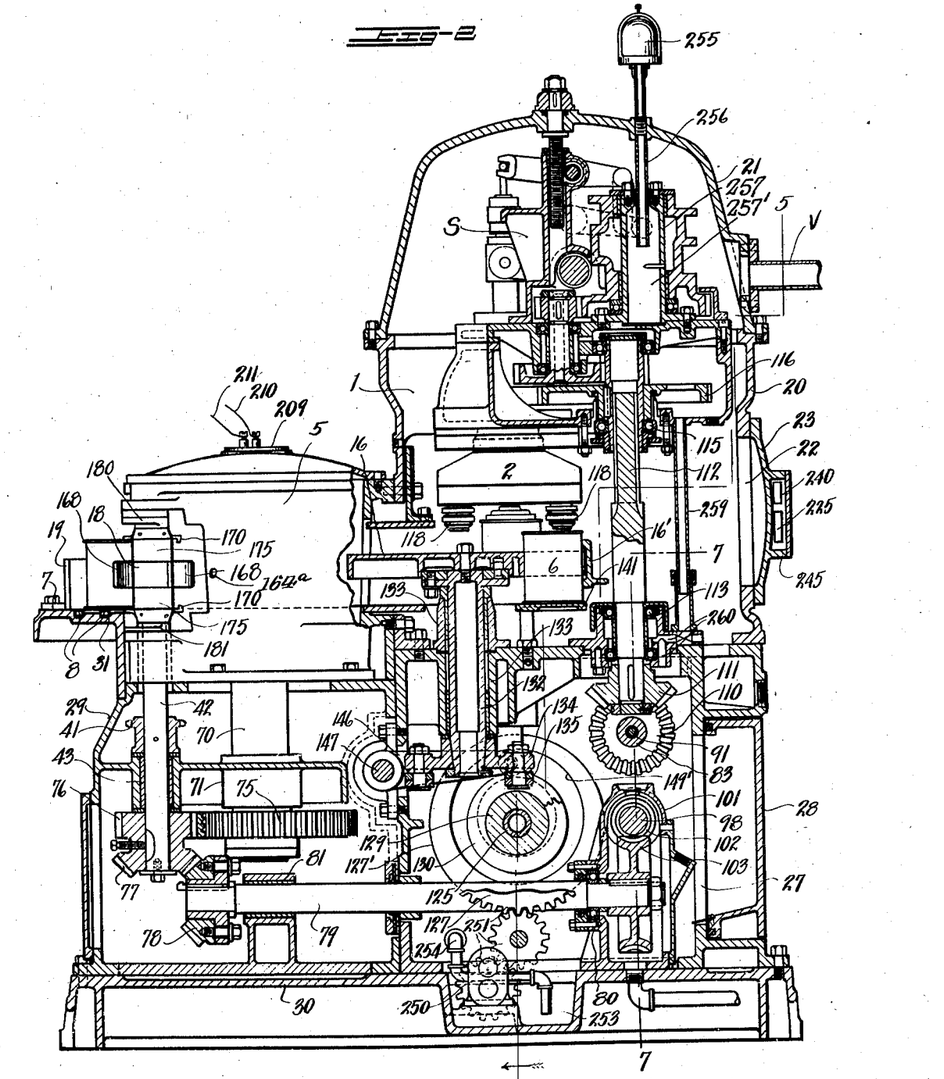
Figure 2 is a vertical section of the machine, taken substantially on the line 2—2 in Figure 4.
Figure 6:
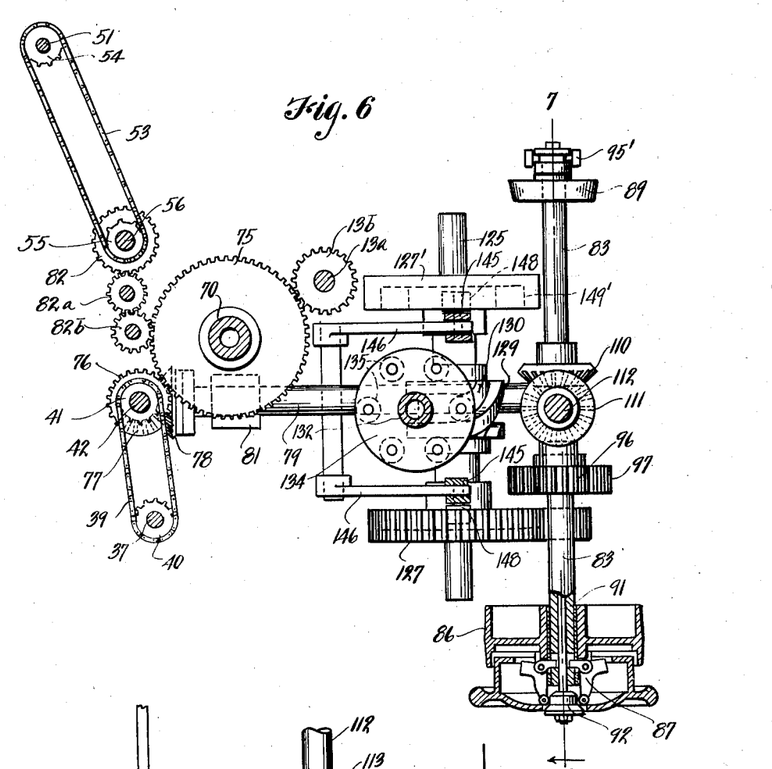
Figure 6 is a view, showing the arrangement of the driving connections for the seamer, the valve and the various turrets and conveying devices.
Figure 8:
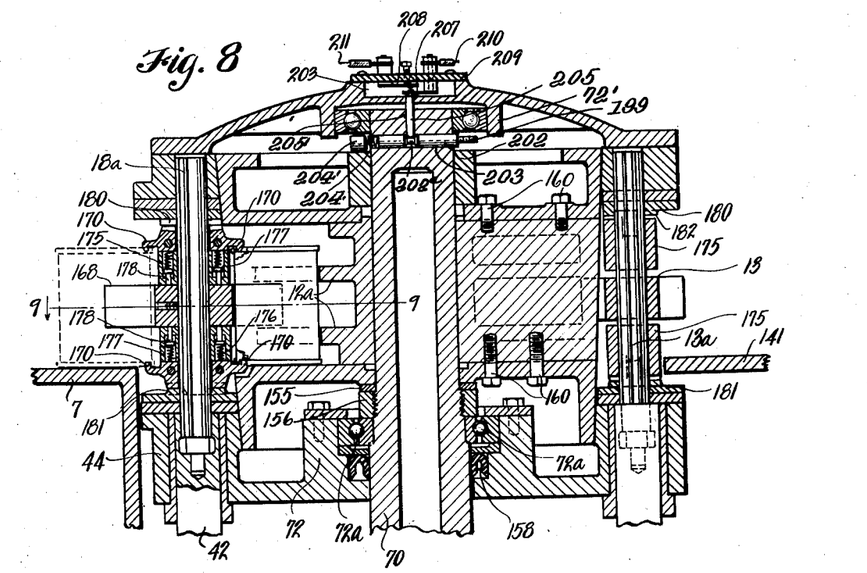
Figure 8 is a vertical, cross sectional view of the valve mechanism, taken on the line 8—8 in Figure 4, particularly illustrating the valve construction and extractor turrets.
Figures 10, 11, 12, 13:
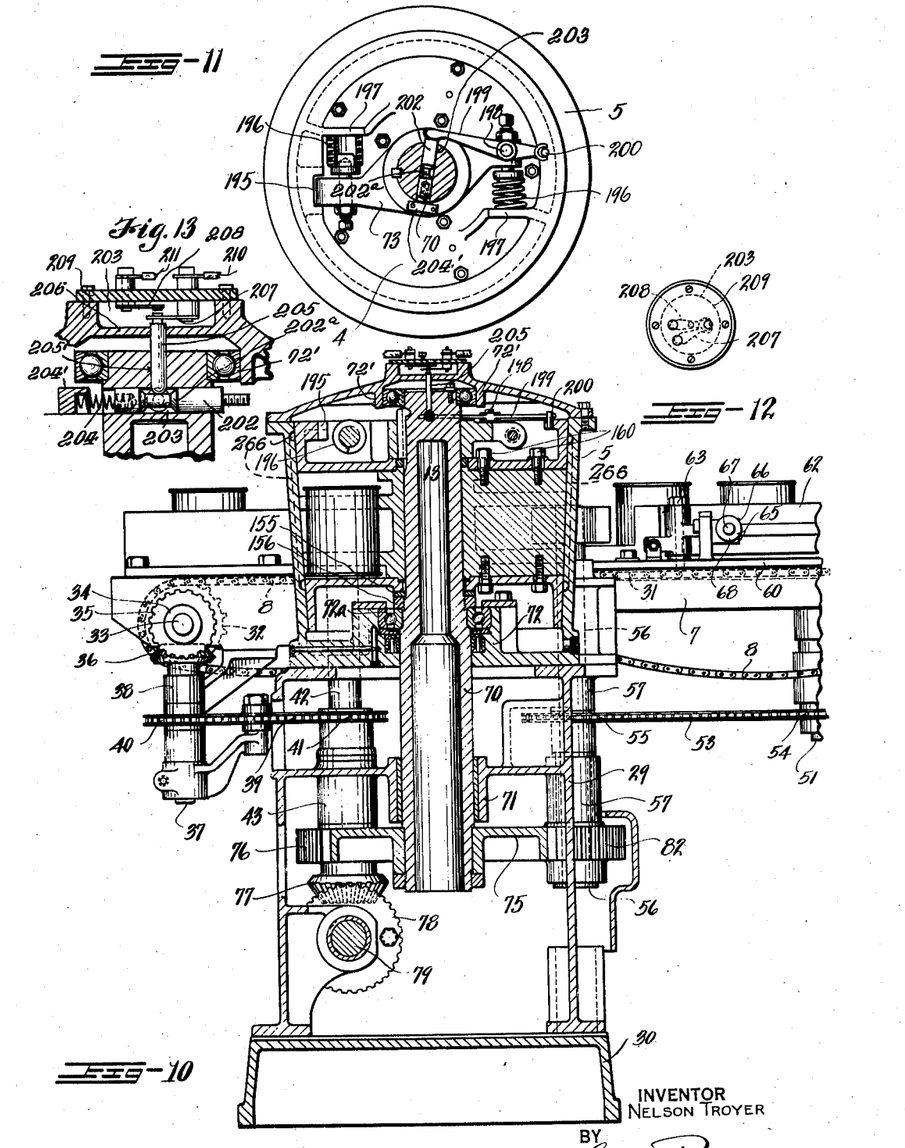
Figure 10 is a vertical section, taken through the valve mechanism, substantially on the line 10—10 in Figure 4.
Figure 11 is an upper end view of the valve, as disposed within its casing, the cover plate of the casing being removed.
Figure 12 is a top view of the plate in which the circuit closing contacts used in connection with the automatic stop device as associated with the valve, are mounted.
Figure 13 is a detail, sectional view through the upper or cover wall of the valve housing, showing the circuit closing bell crank lever operated by the valve.

The valve 4, as shown best in Figures 8 and 10, is mounted on the upper end of a tubular supporting shaft 70 rotatably mounted in bearings 71, 72 and 72' provided therefor in the housing 29 and base wall of valve casing 5 and valve cover plate, respectively. Preferably, anti-friction ball bearings, as at 72a in Fig. 10, would be used in the bearings 72 and 72'. The valve is rotatably driven through the medium of a cross arm 73 that is keyed to the upper end of the shaft 70 and which, at one end, has a driving connection with the valve, as presently described in detail. At its lower end, the valve drive shaft 70 has a driving gear 75 keyed thereto and this gear is driven, see Figure 2, by a gear 76 keyed on the lower end of the shaft 42. Gear 76 is integral with a downwardly facing bevel gear 77 meshing with a driving bevel gear 78 fixed on the end of a horizontal, driven shaft 79 carried in supporting bearings 80 and 81 formed in housings 26 and 29, as shown in Figure 2, and having driving connection with the main drive shaft 83. Through the gears 75 and 76 the valve and extractor turret 18 is synchronized. It will be here stated, also, that the shaft 56 which drives the feed turret 10 and from which the timing screw 9 is driven by sprocket chain 53 is synchronously driven with the valve 4 by means of a gear 82 that is keyed on shaft 56 and which is driven from gear 75 through the intermediacy of two idler gears 82a and 82b, as shown in Figure 6; these idler gears being mounted in the housing 22. The turret 13, whereby cans are delivered from the valve into the vacuumizing chamber and seamer mechanism is mounted on a vertical shaft 13a and this is revolubly driven in synchronism with the valve and turret 16 by means of a gear 13b at its lower end in mesh with gear 75, as shown in Figure 6.

The main drive shaft 83 of the machine extends horizontally and transversely through the housing 26 and it is rotatably supported in suitable anti-friction bearings 84 and is suitably packed, as at 85, to prevent leakage of air at points where it passes through the housing. At one end, the shaft is equipped with a driving belt wheel 86 adapted to be operatively connected to the shaft by a suitable clutch mechanism designated at 87. Slidably keyed on the other end of the shaft is a brake cone 89 adapted to be tightened against a correspondingly tapered surface within a clutch head 90 fixed to the housing. A shift rod 91 extends centrally through shaft 83 with a clutch cone 92 fixed thereon at one end, see Figure 6, for setting or releasing the clutch mechanism 87 and having connection at its other end with the brake cone 89 so that setting of one releases the other and vice versa. A control lever 93 is mounted on a bracket 94 and has operative connection, through its mounting shaft 95 and yoke 95', with the rod 91 for throwing the machine into or out of gear.

Keyed onto the main shaft 83 within the housing 26, is a gear 96 and this drives a gear wheel 97 keyed onto a supporting shaft 98 that is disposed parallel with and directly below the shaft 83 and rotatably supported at its ends in a bearing 99 formed in a side wall of the housing 26 and in bearings 100—100' in a gear housing 101 fixed to the base 30 of the housing 26. The shaft 98 is formed with a worm thread 102 and this drives a gear 103 disposed within the housing 101 and keyed to the end of shaft 79 which extends forwardly to drive the valve 4 and turret shafts, 42 and 56, as was previously described.

Keyed onto the shaft 83 is a bevel gear 110 which drives a bevel gear 111 keyed on the lower end of a drive shaft 112 for the double seamer mechanism; this latter shaft extends vertically through a suitable anti-friction and supporting bearing 113 fixed within an opening in the top wall of the housing 26. The upper end of shaft 112 is suitably supported in a bearing 115 and has an adjustable, keyed connection with a gear 116 by means of which the mechanism of the seamer spindles 2 and 3 are driven.

Since the details of construction of the double seamer mechanism, per se, forms no part of the present invention, it will be only briefly described by stating that the seamer heads 2 and 3 are revolubly driven and are disposed directly above the path of cans advanced through the chamber by the turret 16. Each head embodies paired seaming rolls, as at 118, adjustable from and toward each other and these in the seaming operation are disposed at diametrically opposite sides of the can ends and are drawn inwardly, while the heads are revolved, against the edge of the can end to effect the seam forming operation, as is well understood in the art. After the initial seaming operation by the first set of seaming rolls, the cans are advanced to the second head for completion of the operation. The cans, during the seam forming operations, are held stationary in the turret 16 after being slightly elevated to the position for seaming.

The double seamer mechanism is supported within the vacuum chamber on brackets 120 that are cast integral with the housing 20 at opposite sides thereof. Vertical adjustment of the seamer heads and associated mechanisms with respect to the can supporting base is provided for in order to take care of cans of different height and it is for the purpose of permitting this adjustment that the shaft 112 has a sliding, keyed connection at its upper end with the driving gear 116. Vertical guides 121 are provided in the housing 20 to cooperate with guides 122 fixed to the seamer and gibs 123 are fixed to the housing against the guides to hold the machine rigid.

Figure 3:
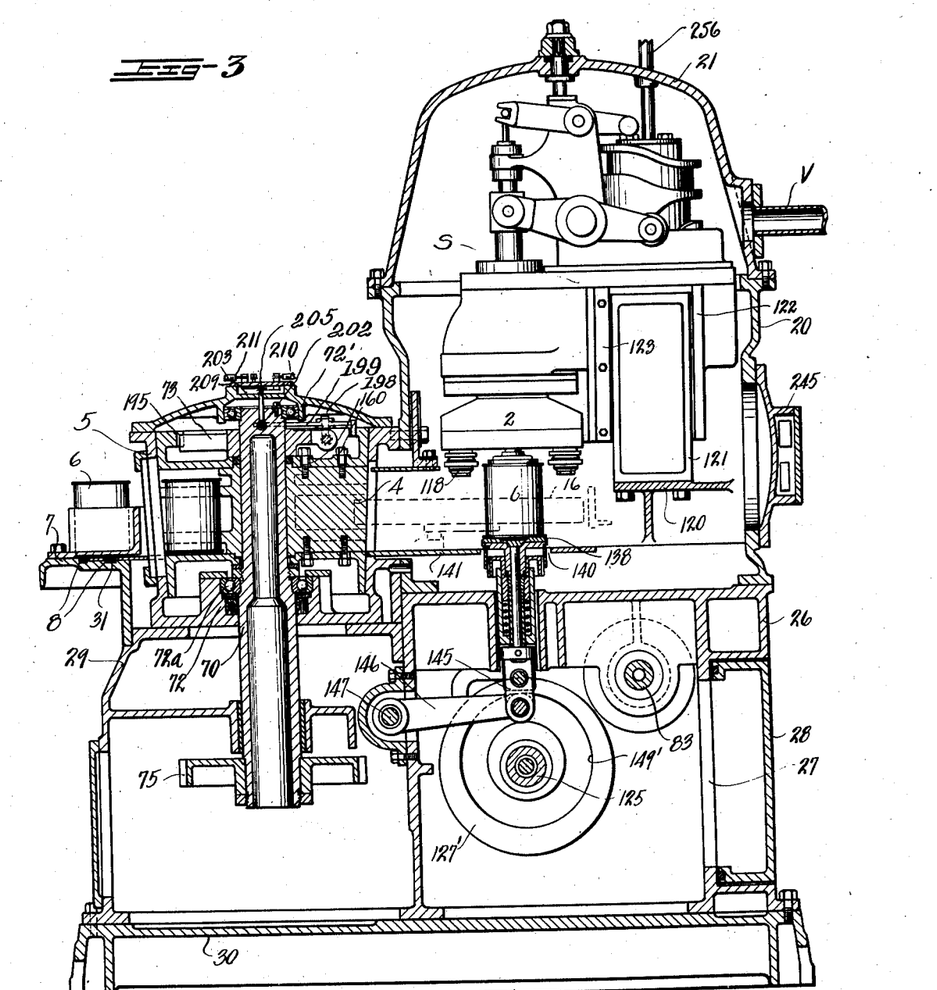
Figure 3 is a vertical section on the line 3—3 in Figure 4.
Figure 5:
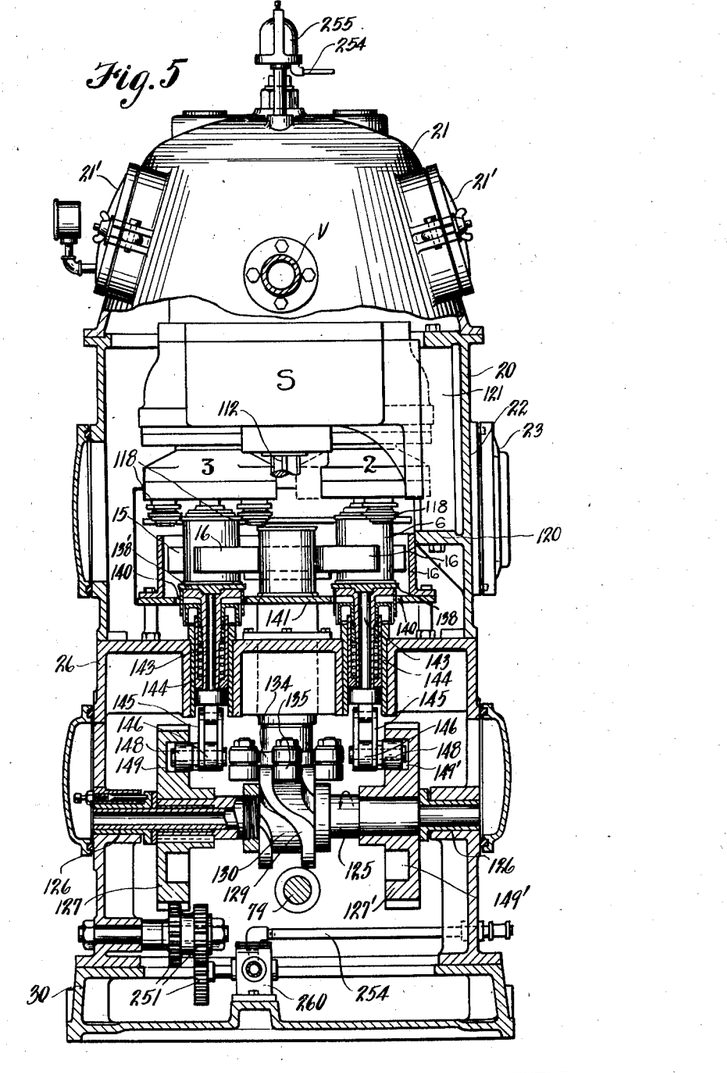
Figure 5 is a vertical section, taken substantially on the line 5—5 in Figure 2, and showing the seamer heads and the indexing mechanism used in connection with the turret for intermittent advancement of cams to the seamer heads.

The indexing means which is provided to intermittently rotate the turret 16 to advance the cans to the seamer spindles and the means for elevating the cans to place their upper end portions between the seaming rolls, is best shown in Figures 2, 3 and 5, wherein 125 designates a horizontal cross shaft supported rotatably at its ends in bearings 126 formed in the side walls of housing 26. This shaft is rotatably driven by a gear 127 which is keyed thereon and which meshes with a gear 128 keyed on the driven shaft 98. Fixed on the shaft 125 is the indexing cam 129 which has a circumferentially directed groove 130 therein opening to opposite sides of the cam. The turret 16 whereby the cans are advanced to and from the seaming spindles is supported by a vertical post 132 revolubly supported in bearings 133 in the top wall of housing 26, as shown in Figure 2. At its lower end the post has a wheel 134 fixed thereto overlying the cam and this wheel is provided on its under side with six concentrically arranged and equally spaced rolls 135 corresponding to the six pockets of the turret. These rolls are adapted to be received successively in the cam groove 130. It is to be understood that this groove is so shaped that as one roll 135 leaves the groove at one side of the cam, the next roll is caused to enter at the opposite side. Each turn of the cam causes the turret to be advanced, after a certain interval of rest, through one-sixth of a turn. The cans 6 are advanced successively from the valve 4 by the turret 13 and are placed in successive pockets of the turret 16 during periods of rest of the turret. The first advance movement of the turret 16, after a can is received therein, places the can in registration with the first seamer head, then, by two more advance movements, the can is placed in registration with the second seamer head for completion of the seaming operation.

In order to position the cans properly with respect to the seaming rolls after they have been brought into registration with the seamer heads, they must be slightly elevated, and for this purpose there are provided the can elevating pads 138—138', see Fig. 5, disposed within openings 140 in a platform or plate 141 upon which the cans are supported and pushed along by the turret, 16. These pads are flush with the top of the plate 141 so that the cans may be slid easily onto them and they are mounted on the upper ends of slides 143 reciprocable in guideways 144 formed in the top wall of housing 26. At their lower ends the slides are pivotally connected by links 145 with the ends of horizontally disposed levers 146 which, at their other ends, are swingingly mounted on a supporting shaft 147. At their swinging ends, the levers 146 carry rollers 148 operable in cam grooves 149—149' provided, respectively, in the side faces of the gear wheel 127 and a similar wheel 127' which are keyed to the shaft 125 at opposite sides of the indexing cam. These cam wheels are timed with the cam 129 so as to actuate the slides to lift the cans thereon into seaming position and then to lower them during periods of rest of the turret 16.

The shaft 147, which mounts the levers 146, is attached to the front side wall of housing 26. The levers 146 serve to retain the can slides from rotating in their guides and also relieve the rollers and slides from lateral strain under the driving action of the rotating cam wheels.

Referring now more in detail to the construction of valve 4, and its casing 5: The valve is circular in cross section and is slightly tapered from the top downwardly. The casing 5 is correspondingly tapered and the valve is disposed within it in an air-tight connection provided by an oil film seal between the surfaces of the valve and its casing.

The valve, as shown best in Figures 8 and 10, has its base wall provided with a central opening through which the shaft 70 extends. This base wall rests upon an adjustment washer 155 which in turn rests upon a nut 156 whereby the inner raceway of ball bearing 72a is held down in place; the nut being threaded onto the vertical shaft 70. The proper adjustment of the valve within the casing to obtain the desired sealing effect is obtained by selection of an adjustment washer of proper thickness. Preferably a clearance of four-thousandths of an inch is desired between the valve surface and casing. The base of the valve casing 5 is closed and the opening through which shaft 70 extends is suitably packed, as at 158, to prevent leakage past the bearing 72a.

Figures 4, 4A, 4B:
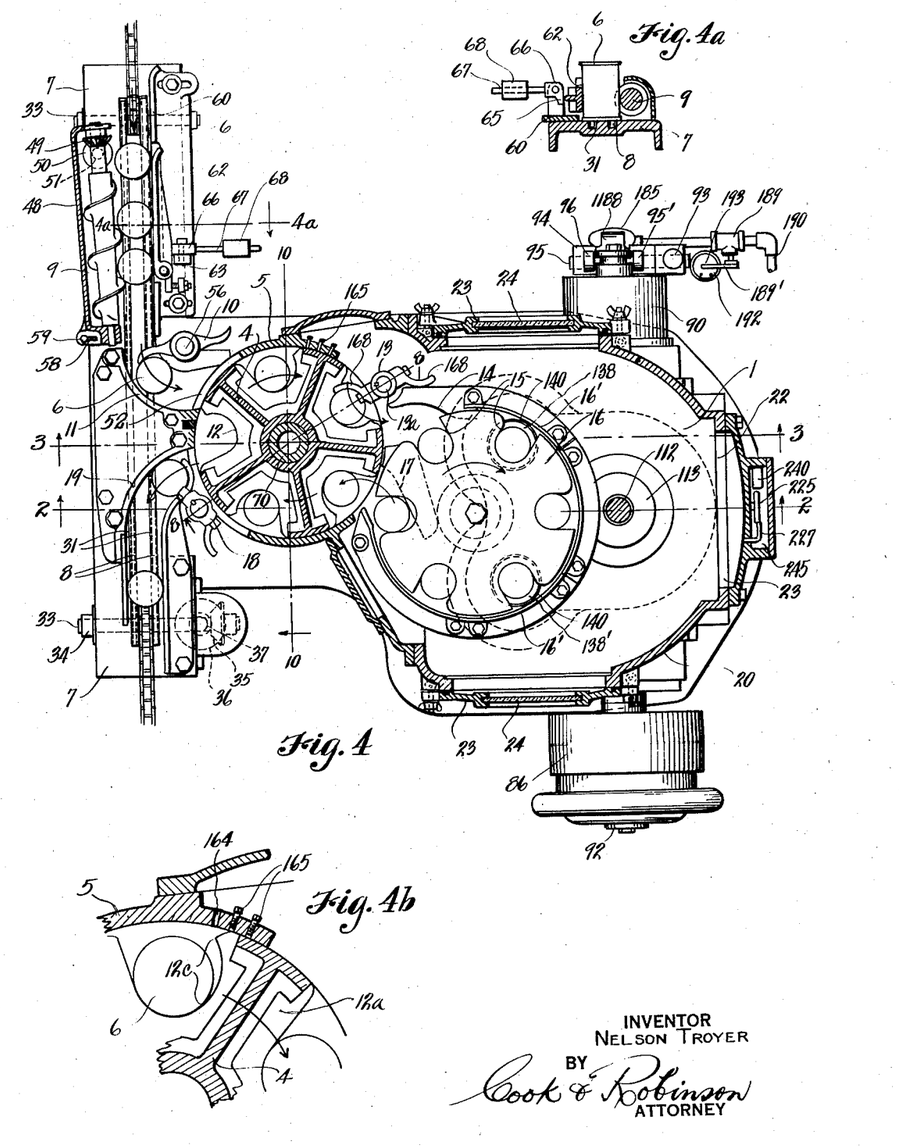
Figure 4 is a horizontal section through the valve mechanism, particularly illustrating the can path and the various can conveyer mechanisms for advancement of cans into and from the vacuum chamber.
Figure 4a is a detail sectional view on line 4a—4a in Figure 4.
Figure 4b is a horizontal, sectional view of a valve casing detail.
Figure 9:
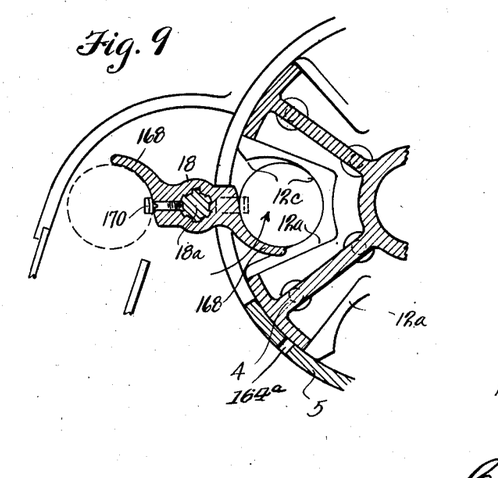
Figure 9 is a sectional view on line 9—9 in Figure 8.

By reference to Figure 4 of the drawings, it will be observed that the valve 4 is divided by radial walls into five separate compartments and each compartment is formed with vertically spaced, horizontally projecting flanges 12a, as in Figures 8 and 9, whereby the can receiving pockets 12 are formed. In its preferred construction, the valve comprises a top section, a central section, and a bottom section, rigidly joined together by bolts 160 which project through the top and bottom sections into the partition portions of the central section. This valve construction is desirable as it makes possible the interchangeable use of different central sections to accommodate cans of different diameters. The top and bottom wall portions of the valve form the top and bottom walls of the pockets and the bottom wall is set flush with the platform 7 and also flush with plate 141 so that cans may be slid easily from one to the other.

Provision is made in the valve casing also for permitting of a gradual or stepped application of vacuum to the cans prior to their delivery from the valve into the vacuumizing chamber, and also for a gradual breaking of vacuum in the valve chambers at the outgoing side. By referring to Fig. 4, it is seen that as each valve compartment passes from registration with the receiving opening 52 of the casing, it is entirely closed for a short interval of travel by a section of the casing wall. This section of casing is provided with a series of small, horizontally spaced ports 164, see Fig. 4b, through which vacuumization of the pocket may take place gradually before the pocket is brought directly into communication with the vacuum chamber. This application of vacuum through ports 164 may be regulated as desired by insertion of or the removal of screw plugs 165 for the ports. It may happen also, when half length or short length cans are vacuumized, that a sudden beating of vacuum in the valve chambers will cause upsetting or tilting of cans which interferes with proper withdrawal by the turret 18. To overcome this, I have provided the vacuum break port 164a adjacent the valve outlet, as shown in Fig. 9, through which air may enter to gradually fill the chamber and thus avoid that sudden inrush that otherwise would occur when the chamber came abruptly into registration with the outlet.

One of the principal features of construction of the present machine resides in the use of extractor turrets in connection with the valve instead of the ejector devices as are usually embodied in such valves; the present valve being entirely free of all internally contained devices for removal of the cans. By reference to Figs. 4, 8 and 9, it is disclosed that the turrets 13 and 18 rotate in the same direction as the valve and each comprises two laterally extending arms with forwardly curved fingers 168 at their ends adapted to swing into the valve pockets to engage with the cans in a manner designed to push the cans from the pockets. This result is obtained by a very exacting development of the pocket wall, as shown in Figure 9, wherein that part of the pocket designated at 12c serves as a guide along which the can may be pushed by the turret arm to deliver it from the pocket. The turret arms do not serve as hooks, but rather as pushers and the fact that they operate to extract the cans from the valve pockets, is due to the fact that they are so timed with the valve as to cooperate with the guide surfaces 12c for extracting the cans. It will be stated also that, through the driving gearing provided for the extractor devices, whereby they are synchronized in their movement with the rotating valve, they are caused to rotate at a slightly faster lineal speed than the travel of the cans in the pockets so that, due to this difference in speeds, the extractor fingers engage the back sides of the cans and push against them, thereby advancing them outwardly along the cam surfaces 12c of the pockets. The surfaces 12c in this instance act, in effect, as stationary cams along which the cans are advanced by the extractor finger.

While under normal conditions, with perfectly formed cans, the turrets as shown would be sufficient for extraction, but it is desirable to positively insure against any mishap that might result from a can that is dented or otherwise damaged passing through the valve. Therefore, in addition to the extractor fingers, I have provided each turret arm with a pair of grippers 170 designed to grip over the opposite end flanges of the cans to thereby positively insure removal of the cans from the valve pockets.

Figures 8A, 8B:
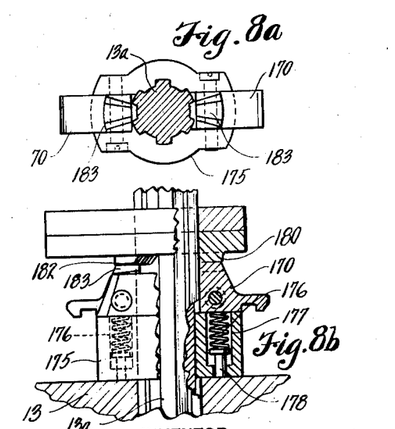
Figure 8a is a top view of one of the extractor finger holders.
Figure 8b is a side view of the same, partly in section.

The character and arrangement of these grippers and their relation to the extractor arms is best shown in Figures 8, 8a and 8b, wherein the turrets 13 and 18 are shown to be splined onto their respective drive shafts 13a and 18a so that the turret arms will engage the cans approximately midway between their upper and lower ends. Splined onto the shafts just above and just below the turrets, are holders 175 in which the gripper fingers 170 are fixed. The fingers are arranged in pairs, in vertical alinement and in opposed relation, and each comprises an extended, hook portion designed to grip over the flanged end of a can. The holders have a limited, slidable movement on the shaft from and toward the turret in order to permit the grippers to be engaged with and disengaged from the cans flanges and they are normally urged outwardly by the pressure of coiled springs 176 that are contained within bores 177 of the holders, and seat upon pins 178 which bear against the turret. Inward action of the holders, whereby the grippers are caused to grip the cans, is effected by cam plates 180—181 that are disposed about the driving shafts in fixed relation to the valve casing and which have cam surfaces 182 formed thereon and properly located for contact by cam surfaces 183 on the grippers that the inward action of the grippers will take place at the time the turret fingers come into pushing relation with the cans; this being substantially the position in which the turret is shown in Figure 9. As soon as the can is outside the valve, the grippers pass from the cam surfaces and are pushed out and released from the can, by the action of the springs 176.

Figure 1:
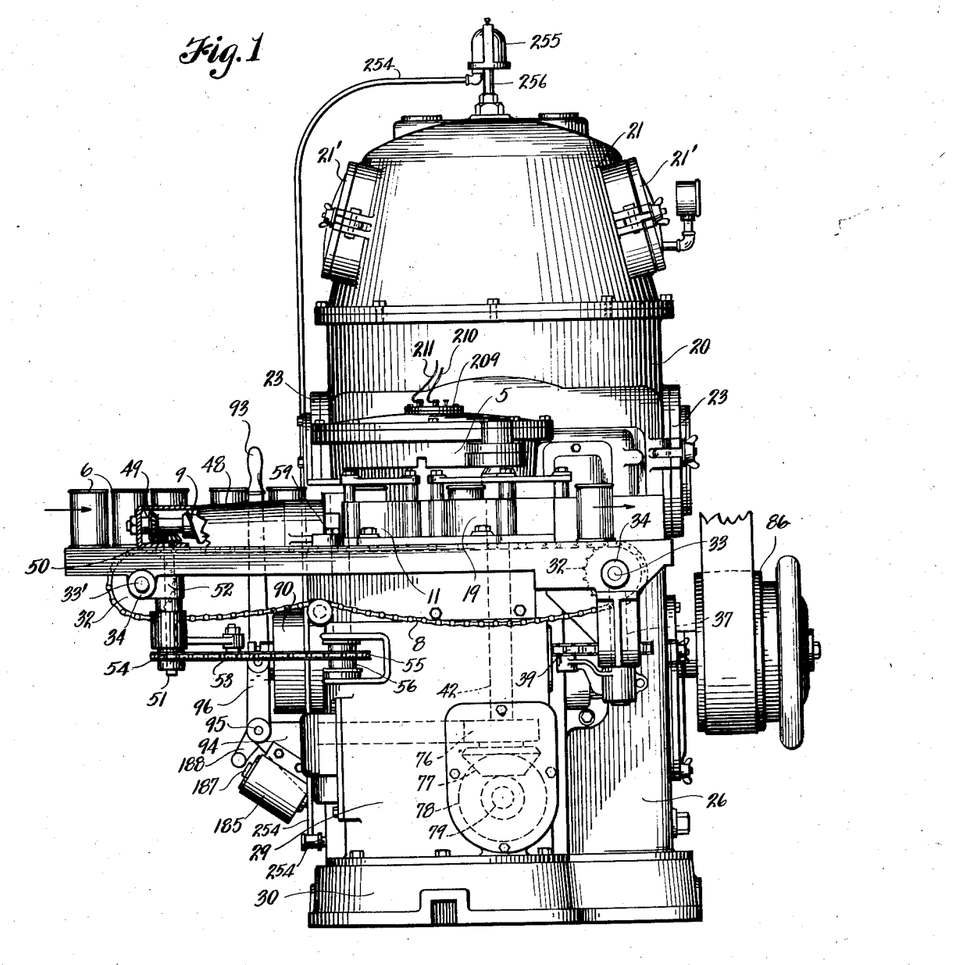
Figure 1 is a front elevation of a can vacuumizing and sealing machine constructed in accordance with the present invention.
Figure 7:
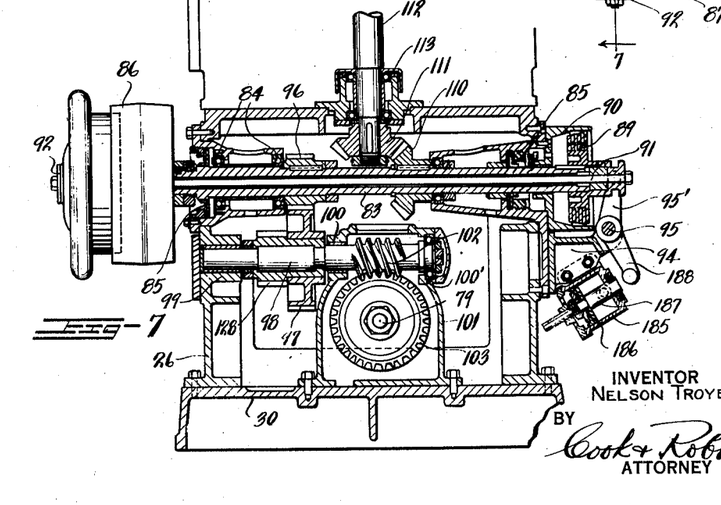
Figure 7 is a vertical section substantially on the line 7—7 in Figures 2 and 6.
Figures 14, 15, 16:
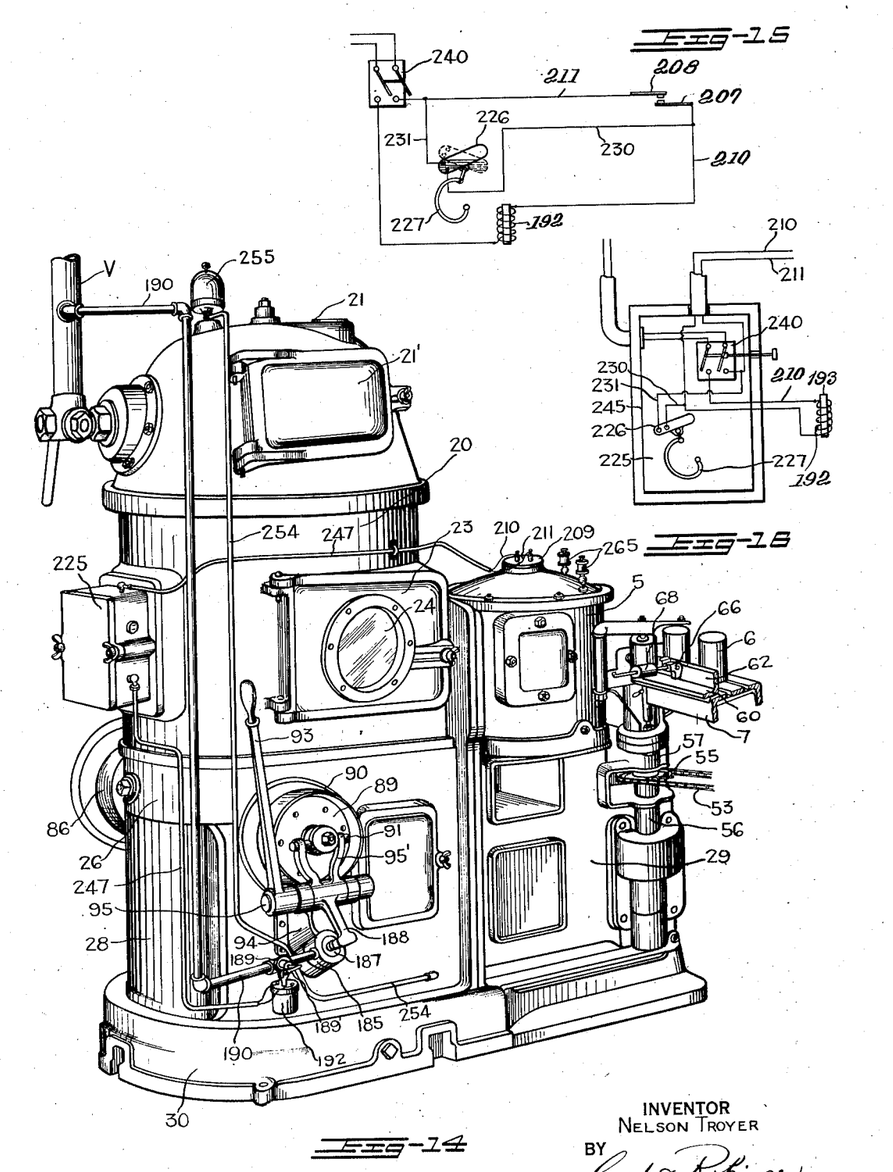
Figure 14 is a perspective view of the machine, showing the arrangement of the automatic stop mechanisms for the machine.
Figure 15 is a wiring diagram for the automatic stop mechanism.
Figure 16 shows the arrangement of the switches within their housing.

For the purpose of automatically stopping the machine in the event that a jam should occur in the valve, such as might be caused by the passage of a dented or deformed can into the machine, or from other causes, I have employed a cylinder 185 that is fixedly mounted by attachment to the bracket 94, see Figures 1, 7 and 16, and wherein a piston 186 is operable. A piston rod 187 is fixed to the piston and extends from the cylinder in a manner for engaging with a lever arm 188 that is fixed to and extends downwardly from the mounting shaft 95 of the control lever. Outward actuation of the piston will be effected by application of vacuum to the outer end of the cylinder and this may be accomplished by the opening of a normally closed valve 189 in a pipe 190 which connects the cylinder with the main pipe V leading to the main source of vacuum. This opening of the valve is herein accomplished by the energization of a solenoid 192 and this causes the core bar 193 of the solenoid to be so moved as to actuate the valve lever 189' of the valve 189 to open the valve. The valve closes automatically on opening of the solenoid circuit. For automatically closing a circuit through the solenoid to effect the stopping of the machine, I utilize the valve driving means, as is best shown in Figs. 10, 11 and 12, wherein it is shown that the valve 4 is loosely mounted on the shaft 70 and is driven by the cross arm 73 which is fixed to the upper end of shaft 70 and which, at one end, is disposed within a recess 195 (Fig. 11) formed in an abutment in the valve top. The cross arm 73 bears at its ends against compression springs 196, see Figure 11, which seat against shoulders 197 formed on the valve top. These springs are of sufficient strength to sustain ordinary driving pressure without being compressed, but should a jam occur in the valve which would tend to stop its rotative movement, the driving pressure then exerted by the shaft 70 would cause the springs to be compressed slightly and thereby permit of a forward, rotative movement of the cross arm with respect to the valve. Pivotally mounted on the cross arm 73, by means of a pivot pin 198, is a lever 199 which, at its outer end, has pivotal connection with the valve rim by means of the stud 200 fixed in the latter, and at its inner end, is so disposed as to engage with the outer end of a pin 202 slidably contained within a horizontal bore 203 in the upper end of shaft 70. The pin is urged outwardly by a coiled spring 204 that bears against the inner end of the pin and against a bracket 204' fixed on the hub of arm 73, as shown in Figs. 11 and 13. This pin 202 has a central cam surface at 202a engaging with the lower end of a pin 205 that is slidably contained in a central coaxial bore 205' in the upper end of shaft 70 and extends through a wall portion 206 of the valve housing, and which, incident to inward movement of pin 202, will be moved upwardly to lift a yieldable, electrically conductive arm 207 into circuit closing contact with another arm 208, both of which are mounted by the cover plate 209 that is fixed to the top of the valve housing and which closes a chamber 203 within which these parts are contained. The arms 207 and 208 are connected electrically, through binding posts, with circuit wires 210 and 211. As shown in Figure 15, the wire 210 leads to one contact of a switch 212 through which connection may be made with a source of electricity. Wire 211 leads to another contact of the control switch through the windings of the solenoid.

With this arrangement, any jam in the valve causes actuation of the lever 199 to move the bell crank 202 and thereby press the arm 207 into contact with arm 208 and this closes the electric circuit through the solenoid 192. Energization of the solenoid opens the valve 189 and admits vacuum to the cylinder 185 and this actuates the piston rod outwardly against the lever 188 and, through the mechanisms previously described, as shown in Figure 7, simultaneously releases the driving clutch 87 and applies the brake to quickly and effectively stop the machine.

In order to automatically stop the machine in event that the vacuum in the chamber becomes insufficient, I have provided an automatically actuated switch, as designated in its entirety at 225 in Figures 15 and 16 and which includes a straight glass tube 226 in which a quantity of mercury or the like is contained. The tube is centrally pivoted and may be tilted to cause the mercury to flow from one end to the other and it is connected with one end of a Bourdon tube 227, as used in pressure gauges, and which connects at its other end with the vacuum chamber. Any change in degree of vacuum within the chamber effects a change in the degree of curvature of the tube and thereby rocks the glass tube on its support. Circuit contacts are made through one end of the glass tube and these are connected, respectively, by wires 230 and 231 with the wires 210 and 211. This valve arrangement is such that so long as the vacuum within the chamber is sufficient the circuit will remain open, but should the vacuum become insufficient the tube 226 will be rocked to cause the mercury to flow to one end thereto to close a circuit connection between the wires 230 and 231 and thereby close an electric circuit through the solenoid which will operate to stop the machine in the manner previously described.

The main control switch, as designated at 240 in Figure 15, whereby the connection with a supply circuit may be opened or closed, and also the mercury switch 225, is contained within a housing 245 that may be formed on the rear closure of the vacuum chamber, as shown in Figure 15, and the wiring connections to the solenoid and contacts in the valve top are suitably enclosed in conduits as designated at 247. A diagram of the arrangement within the housing is shown in Figure 15.

In order that the machine may be effectively lubricated, I have provided an oil circulating system including a pump 250, see Figure 2, that is mounted in the base of the housing 26 and is arranged to be driven by a geared connection, as at 251, with a cam wheel 127. Oil is taken up by the pump from a sump 253 in the base and is delivered from the pump through a pipe 254 into a cup 255 on top of the vacuum chamber. This cup drains into a supporting pipe 256 which delivers the oil from its lower end into a reservoir 257' formed within a tubular supporting shaft 257 about which certain parts of the seamer mechanism operate. From this reservoir 257' the oil flows by gravity over various gears within the seamer mechanism and finally collects within the base of the housing 258 inclosing these parts. From this housing 258 it flows through a pipe 259 into a channel 260 and is distributed by gravity and by the splash system to the various gears and cams contained within the lower housing 26 and from these it gradually finds its way back to the sump for re-circulation. Suitable lubrication for the rotating valve 4 is provided by oil cups 265 mounted on the valve casing and from which oil is fed to the surface of the valve to maintain an oil film seal; the oil flowing from the cups to the valve surface through channels 266 as shown in Figure 10.

I claim:—

1. In a can vacuumizing and sealing machine, a vacuumizing chamber having an opening through which cans are passed into said vacuumizing chamber, a rotary pocketed valve sealing said opening and operable to transfer cans placed in its pockets into the vacuumizing chamber, and means located in said vacuumizing chamber and rotating about a fixed center therein and in synchronism with the rotation of the valve for removing the cans from said pockets, said means cooperating in succession with the valve pockets for removing said cans.

2. In a can vacuumizing and sealing machine, a vacuumizing chamber having an opening through which cans are passed into said vacuumizing chamber, a rotary pocketed valve sealing said opening and operable to transfer cans placed in its pockets into the vacuumizing chamber, means located in said vacuumizing chamber and rotating about a fixed center therein and in synchronism with the rotation of the valve for removing the cans from the pockets, said means including arms movable in succession into the pockets for positively extracting the cans therefrom, and gripping devices associated with each arm for gripping the can to aid in the extraction of the same from the pocket of the valve.

3. In a can vacuumizing and sealing machine, a vacuumizing chamber having an opening, a rotary, pocketed valve sealing said opening and operable to transfer cans placed within its pockets into and from the vacuumizing chamber, and extractor devices externally of the valve and rotating in synchronism therewith and including parts adapted to enter the pockets to engage the cans to effect their removal from the valve following their delivery into and from the vacuumizing chamber.

4. In a can vacuumizing and sealing machine, a vacuumizing chamber having an opening, a rotary, pocketed valve closing said opening and operable to transfer cans placed within its pockets into and from the vacuumizing chamber, and two extractor devices externally of the valve within and outside of the chamber respectively and rotating in synchronism with the valve and including fingers adapted to enter the valve pockets to push the cans therefrom.

5. In a can vacuumizing and sealing machine, a vacuumizing chamber having an opening, a rotary valve closing said opening and having pockets formed therein within which cans are transferred into and from the vacuumizing chamber; said pockets having can guides therein, and extractor devices externally of and rotating in synchronism with the valve and including parts adapted to enter the valve pockets to engage the cans and moving at a speed different from that of the valve to cause the cans to be advanced along said guides and from the pockets.

6. In a can vacuumizing and sealing machine, a vacuumizing chamber having an opening, a continuously rotating valve sealing said opening and having pockets therein for receiving cans for delivery into and from the chamber and can extractor devices adjacent the valve and including parts adapted to swing through the pockets and to positively grip the cans.

7. In a can vacuumizing and sealing machine, a vacuumizing chamber having an opening, a rotary valve closing the said opening and having pockets therein for receiving cans for delivery into and from the chamber, and extractor devices adjacent the valve and operable to remove the cans therefrom and comprising fingers adapted to move into the pockets to engage the can bodies to push them outwardly and grippers on said fingers adapted to engage the ends of the cans during the extracting operation.

8. In a can vacuumizing and sealing machine, a vacuumizing chamber having an opening, a rotary valve closing the chamber having pockets for receiving cans both in their delivery into and from the chamber, and devices adjacent the valve and rotating in synchronism therewith for extracting the cans; said devices comprising laterally directed fingers adapted to enter the pockets to push the cans therefrom, and a pair of grippers associated with each of said fingers adapted to engage upper and lower ends of the cans, and devices associated with the grippers whereby they are moved into and from gripping relation with the cans.

9. In a machine of the character described, the combination with a rotary carrier having can receiving pockets, of an extractor device comprising a rotating arm timed with the valve movement to enter pockets of the valve for the ejection of cans therefrom; a rotating shaft on which said arm is mounted, gripper mounting devices slidably keyed on the shaft at opposite sides of the arm, grippers mounted by said devices for engaging opposite ends of a can, means for urging the devices apart to receive a can between the grippers, and cams for moving them toward each other to cause the grippers to engage opposite ends of a can being advanced by the arm.

10. In a can vacuumizing and sealing machine, a vacuumizing chamber having an opening, a can sealing machine within the chamber, a rotary pocketed valve closing said opening, means for delivering cans that are to be vacuumized and sealed into the valve pockets, rotary means within the chamber adjacent the valve for extracting the cans from the valve to the sealing machine, means for delivering the sealed cans back into the valve pockets for delivery from the chamber and means outside the chamber and adjacent the valve for extracting the cans from the valve pockets upon delivery from the vacuumizing chamber.

11. In a can vacuumizing and seaming machine, a vacuumizing chamber, a seaming mechanism therein, a valve housing opening into the chamber and to the outside thereof, a valve rotatably contained in the housing having pockets therein within which cans may be transferred from outside the housing into the vacuumizing chamber; and means for transferring the cans between the valve pockets and seaming mechanism said housing wall having a series of ports therein opening into the chamber and through which there will be a gradual application of vacuum to the said pockets as they are brought, by rotation of the valve, into registration with successive ports and prior to delivery into the vacuumizing chamber.

12. In a machine of the character described, the combination with a driving element and a disconnecting means therefor, of a revolubly driven shaft, a valve loosely mounted on the shaft, an arm fixed to the shaft, a spring interposed between the arm and valve to rotate the latter with the shaft and yieldable under abnormal working strain and devices operable incident to such yielding of the spring to effect actuation of the disconnecting means.

13. In a machine of the character described, the combination with a driving element and a disconnecting means therefor including a controlling, normally open electric circuit, of a valve shaft adapted to be rotated through connection with the driving element, a valve loosely mounted on the shaft, for limited rotative movement and having abutments thereon, a cross arm fixed to the shaft, springs interposed between the cross arm and abutments of the valve to drive the latter and yieldable under abnormal working strain, a lever pivotally connected with the valve and with the arm and movable incident to yielding of said springs to effect the closing of the said electric circuit on energization of the said disconnecting means.

14. In a machine of the character described, the combination with a driving element and a disconnecting means therefor including a controlling, normally open electric circuit, of a valve shaft rotatably driven through connection with the driving element, a valve loosely mounted on the shaft and having abutments thereon, a cross arm fixed to the shaft and extended at its ends adjacent the valve abutments, springs interposed between the ends of the arm and said abutments and adapted to yield under abnormal working strain, a lever pivotally mounted on the arm and having a pivoted connection at its outer end with the valve, a bell crank supported by the arm and adapted to be actuated by movement of the inner end of said lever, that is incident to yielding of said springs, a pair of normally disconnected contacts in said electric circuit and means movable by the bell crank to move said contacts into engagement to close the said electric circuit to effect operation of the driving element disconnecting means.

15. In a can vacuumizing and sealing machine, a vacuumizing chamber having an opening, a source of vacuum for said chamber, a main drive shaft for the machine, a driving means for said shaft, a clutch for making or breaking driving connection between said driving means and the main shaft, a clutch shifting means including a cylinder, a piston movable therein and having operative connection with the clutch, a connection leading into the cylinder from the source of vacuum, a valve in said connection, a solenoid for actuating the valve and a circuit for the solenoid including spaced contacts, a rotary valve in the chamber opening, a drive shaft on which the valve is loosely mounted, a cross arm fixed to the shaft, yieldable means between the arm and valve to rotate the latter and yieldable under abnormal pressure and means operable incident to relative movement of the valve and shaft, incident to yielding of said element, to move said contacts of the circuit together to close the circuit to effect actuation of the clutch to release the driving connection.

16. In a can vacuumizing and closing machine, a vacuumizing chamber, a can closing machine in the chamber, a valve housing with openings located in spaced relation and opening respectively into the vacuumizing chamber and to the outside thereof, a valve rotatable in the valve housing and having pockets therein for receiving cans through one of said openings and in which the cans are transferred for delivery to the chamber and closing machine through the other opening, and means permitting of a gradual application of vacuum to the valve pockets while moving between the said openings of the housing.

17. In a can vacuumizing and sealing machine, a vacuumizing chamber, a sealing mechanism therein, a valve housing opening into the chamber and to the outside thereof, a valve rotatably contained in the housing and having pockets therein within which the cans may be transferred from the outside of the housing into the vacuumizing chamber, said valve housing having an extended wall with which the valve makes airtight engagement, said wall having a series of ports therein opening into the vacuumizing chamber, which ports are passed in succession by the valve pockets so that a vacuum is gradually drawn on the valve pocket prior to the opening of the valve into the vacuumizing chamber.

NELSON TROYER.